US009842300B2

(12) United States Patent
Moon et al.

(10) Patent No.: US 9,842,300 B2
(45) Date of Patent: Dec. 12, 2017

(54) STATISTICAL MODEL FOR SYSTEMS INCORPORATING HISTORY INFORMATION

(71) Applicant: Utah State University, North Logan, UT (US)

(72) Inventors: Todd K. Moon, Providence, UT (US); Jacob H. Gunther, North Logan, UT (US)

(73) Assignee: Utah State University, Logan, UT (US)

( * ) Notice: Subject to any disclaimer, the term of this patent is extended or adjusted under 35 U.S.C. 154(b) by 461 days.

(21) Appl. No.: 14/532,881

(22) Filed: Nov. 4, 2014

(65) Prior Publication Data

US 2016/0125305 A1 May 5, 2016

(51) Int. Cl.
*G06N 7/00* (2006.01)

(52) U.S. Cl.
CPC .................................. *G06N 7/005* (2013.01)

(58) Field of Classification Search
CPC .................................. G06N 7/005; G06N 7/02
USPC ............................................................. 706/52
See application file for complete search history.

(56) References Cited

U.S. PATENT DOCUMENTS

| 5,465,321 A * | 11/1995 | Smyth ................. G06F 11/2257 376/216 |
| 2002/0099594 A1 * | 7/2002 | Heard .................... G06Q 30/02 706/12 |
| 2003/0088412 A1 * | 5/2003 | Shetty .................... G10L 15/14 704/243 |
| 2004/0167893 A1 * | 8/2004 | Matsunaga .......... G06K 9/6297 |
| 2005/0162377 A1 * | 7/2005 | Zhou ....................... G09G 3/34 345/107 |
| 2008/0275743 A1 * | 11/2008 | Kadambe ............... G06Q 10/04 705/7.25 |
| 2012/0054133 A1 * | 3/2012 | Jallon .................. G06K 9/6297 706/12 |
| 2013/0238543 A1 * | 9/2013 | Jallon ................... G06F 19/345 706/46 |

OTHER PUBLICATIONS

Moon et al., "Quasicontinuous State Hidden Markov Models Incorporating State Histories", IEEE, Nov. 2, 2014. (Date and authors prevents usage as prior art).*
Moon et al., "Continuum-State Hidden Markov Models With Dirichlet State Distributions", IEEE, May 26, 2013.*
Moon, T. et al., Quasicontinuous state hidden markov models, IEEE Asilomar Conference on Signals, Systems and Computers (Nov. 2, 2014).

* cited by examiner

*Primary Examiner* — Dave Misir (57) ABSTRACT

For calculating statistical Markov model-like state transition probabilities, a method represents state transition probabilities between a plurality of statistical Markov model-like states and output probabilities associated with a plurality of previous statistical Markov model-like states. The state transition probabilities between the plurality of previous states depend on a sequence of previous states of the plurality of previous states. The output probabilities associated with each of the plurality of states depend on the sequence of previous states.

15 Claims, 12 Drawing Sheets

STATISTICAL MODEL FOR SYSTEMS INCORPORATING HISTORY INFORMATION

BACKGROUND

Field

The subject matter disclosed herein relates to modeling statistical dynamical system in a way that incorporates histories including information in addition to the most recent state.

Description of the Related Art

Hidden Markov models (HMM) are often used in signal processing applications.

BRIEF SUMMARY

A method for calculating statistical Markov model-like state transition probabilities is disclosed. The method represents state transition probabilities between a plurality of statistical Markov model-like states and output probabilities associated with a plurality of previous statistical Markov model-like states. The state transition probabilities between the plurality of previous states depend on a sequence of previous states of the plurality of previous states. The output probabilities associated with each of the plurality of states depend on the sequence of previous states.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code or code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a non-transitory, tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Python, Ruby, Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

Figure 1:
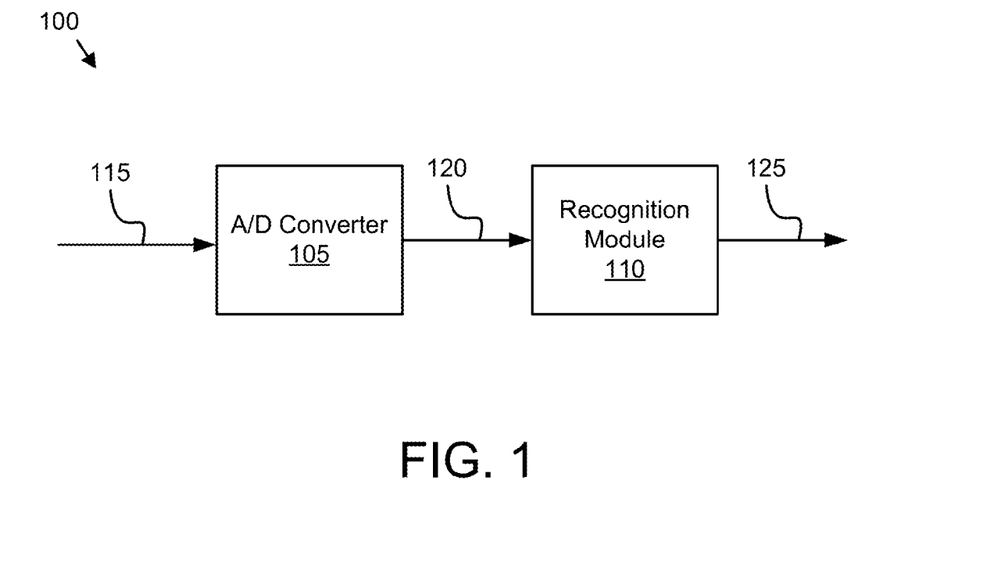
FIG. 1 is a schematic block diagram illustrating one embodiment of a recognition system.

FIG. 1 is a schematic block diagram illustrating one embodiment of a recognition system 100. The system 100 includes an analog/digital (A/D) converter 105 and a recognition module 110. The system 100 receives an input signal 115. In one embodiment, the input signal 115 is an analog signal. In addition, the input signal 115 may be an audio signal. The audio signal may include voice data. Alternatively, the input signal 115 may include handwriting data, data measurements, and the like.

The A/D converter 105 may convert the input signal 115 into a digital signal 120. Alternatively, the input signal 115 may be a digital signal. The recognition module 110 may generate an output signal 125. In one embodiment, the output signal 125 is a text representation of voice data in the input signal 115. Alternatively, the output signal 125 may be an estimate of original true data.

In the past, hidden Markov models (HMM) of states have been used to model signals having statistical variation, to accomplish a variety of signal analysis purposes, such as pattern recognition or detection. The hidden Markov model assumes that each state was memory-less with future states based solely on the present state. However, much useful information may reside in the history of transitions between states. Unfortunately, manipulating this history has been computationally cumbersome. In addition, storage requirements may be prohibitively large. The embodiments described herein calculate statistical Markov model-like state transition probabilities that are used to generate the output signal 125. The statistical Markov model-like state transition probabilities retain a history of transitions longer than the current state while supporting efficient computation. As a result, the determination of the states of the digital signal 120 and the generation of the output signal 125 is enhanced as will be described hereafter.

The recognition module 110 may represent state transition probabilities between a plurality of statistical Markov model-like states and output probabilities associated with a plurality of previous statistical Markov model-like states. In addition, the recognition module 110 may calculate a state transition probability for the plurality of statistical Markov model-like states. The plurality of statistical Markov model-like states may be used to generate the output signal 125.

Figure 2A:
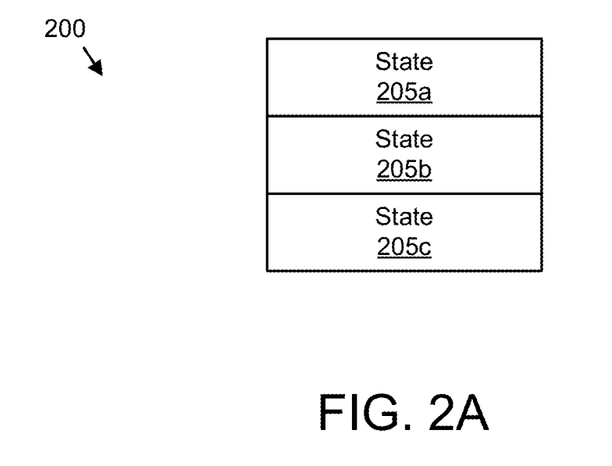
FIG. 2A is a schematic block diagram illustrating one embodiment of a state database.

FIG. 2A is a schematic block diagram illustrating one embodiment of a state database 200. The state database 200 stores a plurality of states 205 of the digitized input signal 115 and/or digital signal 120. As used herein, a state 205 refers to a state $x_t$ for time t where x is a value of the input signal 115. The database 200 may be stored in a memory. In one embodiment, the states 205 are organized in a chronological sequence of values. The sequence may describe a signal such as the digital signal 120.

Figure 2B:
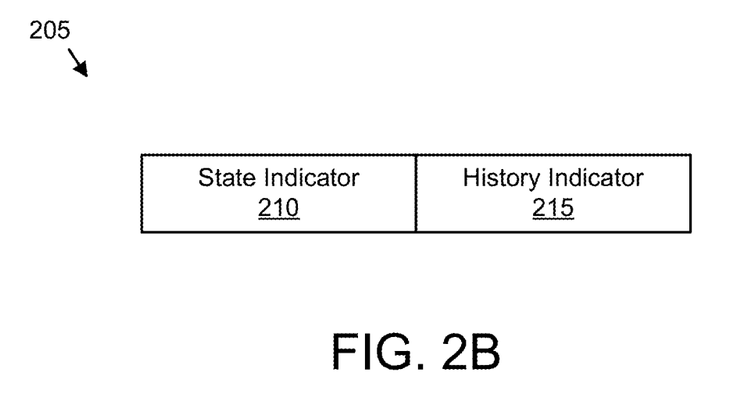
FIG. 2B is a schematic block diagram illustrating one embodiment of a state.

FIG. 2B is a schematic block diagram illustrating one embodiment of a state 205. In one embodiment, the state 205 describes a discrete portion of the input signal 115 and/or digital signal 120. The state 205 includes a state indicator i 210 and a history indicator h 215. In one embodiment, the state indicator 210 is an integer value. The history indicator 215 may comprise a real number. In one embodiment, the real number of the history indicator 215 is created by concatenating a number representing each history transition as the most significant digits of the real number.

For notational convenience, s=S−1. In addition to the basic state transitions such as 0→1, states 205 may include the entire sequence of prior states in the history indicator 215. States 205 may be labeled as i.h, where the state indicator i 210 is an "integer" portion i∈{0, 1, ..., s} that indicates which of S basic states a model is in, and the history indicator 215 is a "fractional" portion h that indicates the sequence of basic states prior to the current state i 205. A state 205 labeled as i.h may transition to a basic state j having label j.ih. This is denoted as i.h→j.ih.

This state labeling generalizes the concept of state conventionally employed in Markov models, since not only the basic state label at some time is relevant, but also its entire history. As the figure shows, distinguishing between all such labels results in an exponential explosion in the number of states.

We associate to the state $x=i.h_1h_2\ldots h_L$ at time L+1 the real number $x=i+\Sigma_{k=1}^{L} h_k S^{-k} h_k = \{0, 1, \ldots, S-1\}$. That is, the real number is obtained using the state 205 in fractional S-ary notation. In S-ary notation, the sequence of previous states 205 is digits in the real number. Because of the state transition rule i.h→j.ih, more recent states have more numerical significance in the transition and output probabilities. Older states have numerically less significance. The state format provides compact and computationally efficient storage of the sequence of previous states.

Figure 2C:
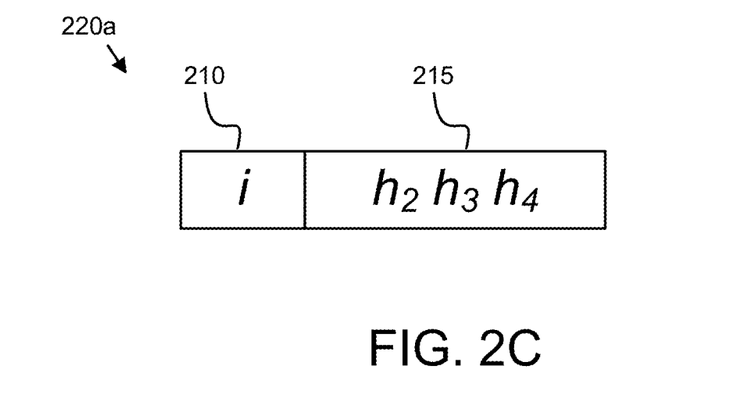
FIG. 2C is a schematic block diagram illustrating one alternate embodiment of a state.
Figure 2D:
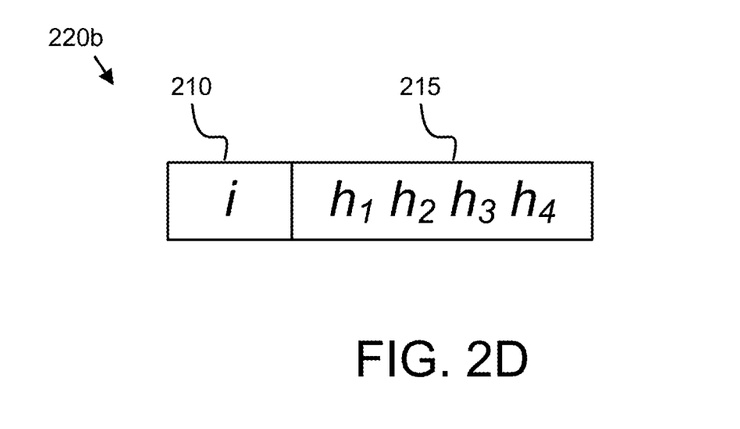
FIG. 2D is a schematic block diagram illustrating one alternate embodiment of a state.

FIGS. 2C-D are illustrations of state mathematical representations 220 of the state 205. FIG. 2C depicts a first state mathematical representation 220a comprising a state indicator 210 and a history indicator 215. The history indicator 215 is a real number. The history indicator 215 is shown with a sequence of three previous states $h_2$, $h_3$, and $h_4$. Of the previous states, $h_2$ represents the most recent state 205 and $h_4$ represents the earliest state 295. A second state mathematical representation 220b in FIG. 2D shows a first previous state $h_1$ 225a that occurred after previous state $h_2$ concatenated as the most significant digits of the real number of the history indicator 215.

Figure 3:
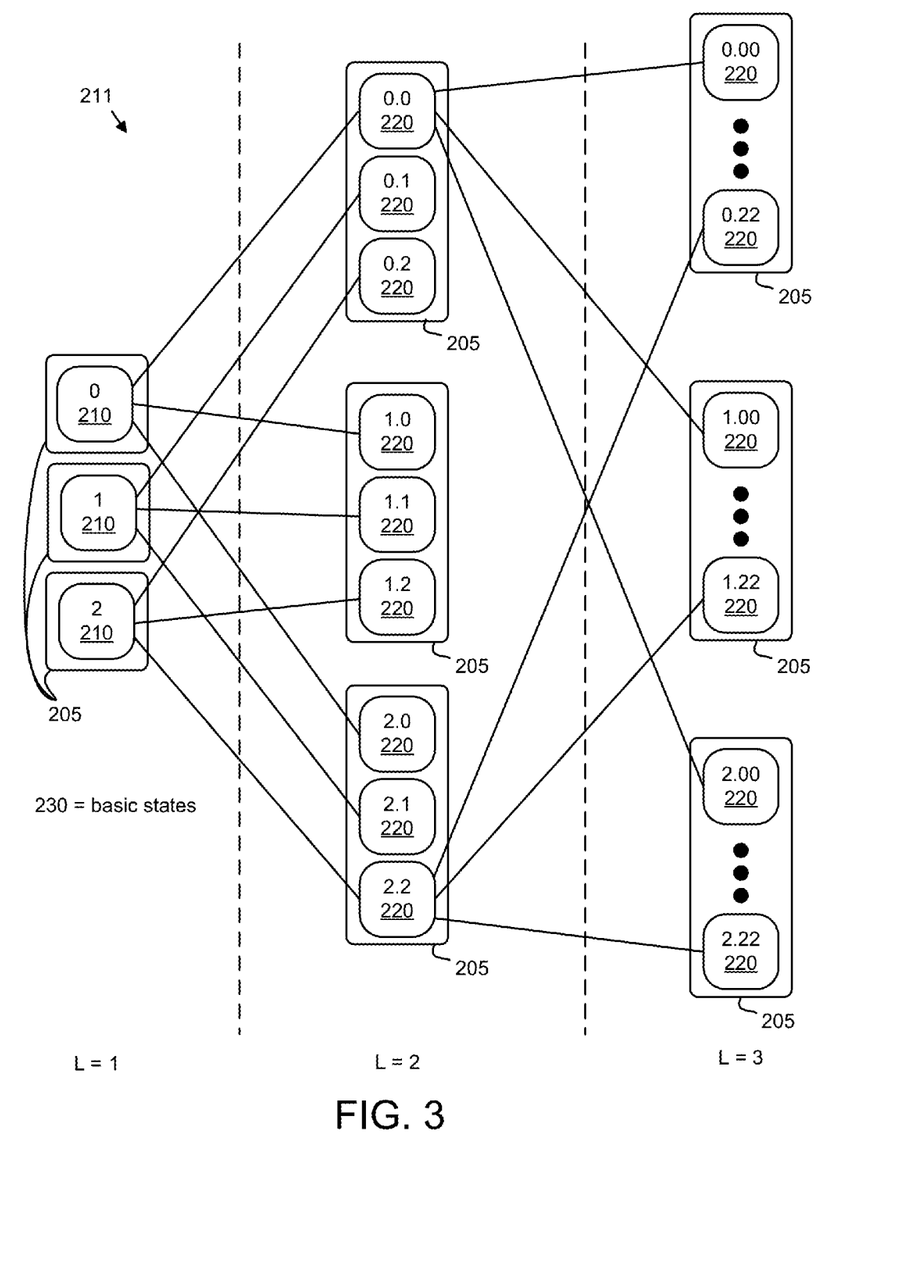
FIG. 3 is a schematic block diagram illustrating one embodiment of state transitions.

FIG. 3 is a schematic block diagram illustrating one embodiment of state transitions 211 for a number of states S 205. In the depicted embodiment, states 205 are shown for integer state indicators 210 for L=1. For simplicity, the integer state indicators 210 are limited to the values of 0, 1, and 2.

For L=2, additional state representations 220 are shown resulting from transitions, depicted as lines, from the state indicators 210. For example, if the state indicator is 1, subsequent states 205 may have mathematical representations of 0.1, 1.1, and 2.1.

In the limit as the number of time steps L→∞, if all state transitions are allowed, the closure of the set of real numbers corresponding to states 205 that conceptually fill the continuum [0.0000..., s.ssss...], that is, the interval is $I_S$=[0, S)⊂R. Ignoring equivalences such as 0.ssss... = 1.0000... which occur on a set of measure zero, there is a one-to-one correspondence between states 205 and real numbers in $I_S$—a state label is an S-ary representation of a point in $I_S$—which are used herein interchangeably. Alternatively, if all state transitions are not allowed, the history can still be thought of as existing on the continuum, but some states 205 may occur with probability zero.

Even though there are an infinite number of states 205 i.h∈$I_S$, there are still only a finite number S of states 205 at each time step L. The states 205 are associated with conventional HMMs. For the state 205 i.h, we distinguish between the state indicator i 210, and the history indicator h 215.

This model may be referred to as a quasicontinuous hidden Markov model (qcHMM) because, while the state 205 exists (in the limit) on the continuum $I_S$, one may distinguish between the basic states 205 with the state indicator 210, and combining the state indicator 210 and history indicator 215, the state transitions are governed by the rule i.h→j.ih. However, qcHMM is not Markov, and instead employs statistical Markov model-like states 205.

As a practical matter, the state 205 can only accurately represent a history indicator 210 with a length determined by the numerical precision of the floating point representation. For example, for a machine with ten decimal places, then the history indicator 215 is accurate to about L steps where $S^{-L}=10^{-10}$. Furthermore, recovery of the exact sequence of previous states 205 is limited by roundoff in arithmetic operations.

For state $x=i.h_1h_2h_3\ldots$, the state 205 is given by [x], where [x] denotes the greatest integer less than or equal to x, and the state history is given by $hist(x).h_1h_2h_3\ldots$. The state history is thus a number in [0,1). Computationally, a state 205 may be represented using a number in floating point format (e.g., a double in C or C++).

State Transition Probability

The state transition probability in a conventional HMM may be denoted as $a_{j|i}=P(x_{t+1}=j|x_t=i)$. In the present model, the state transition probability between the state 205 at time t, $x_t=i.h_0h_1=i.h$, and the state 205 at time t+1, $x_t=j.ih_0h_1=j.ih$ is $a_{j|i}(h)$. This may be thought of as a state transition $a_{j|i}(h)$ that is a function of a real number $h\in[0,1)$ representing the history indicator 215. The real-numbered history indicator 215 provides an additional degree of freedom which can be used in the model. Storing the conventional state transition probabilities a requires storage of $S^2$ real values, and in the embodiments $S^2$ functions over [0,1) must be stored. These may be represented using M coefficients, so storage of state transition probabilities requires $O(MS^2)$ memory.

Output Probability

The output probability distribution of an output in a conventional HMM may be denoted by $p_i(y)$. In the embodiments the distribution of a state i.h 205 is denoted by $p_i(y:h)$. This may be thought of as an output distribution $p_1$ as a function of the real number $h\in[0,1)$.

Viterbi State Sequence Estimation

The Viterbi ML sequence estimation algorithm may be applied to the embodiments For the set of states at time t, let $\{M(t,i), i=0,\ldots,s\}$ denote the set of path metrics for paths to each basic state i 205 at time t where M is a metric, and let $\{x^{0t}, x^{1t} \ldots x^{s,t}\}$ denote the set of states 205 at time t, where $x^{it}=i^t.h^{it} \ldots, i'0, 1, \ldots, s$. That is, $h^{it}$ represents the history of the states 205 leading to state i 205 at time t. Let $\gamma(t,x^{it}.j)$ denote the branch metric, measuring $\gamma_f$ emitted from state $x^{it}$ on the transition from basic state i 205 to basic state j 205 at time t. Using the principle of optimality results in Equation 1.

$$\{M(t+1,j), i_{min}\} = \begin{array}{c}\{\min, \operatorname{argmin}\}\\ i \in (0,\ldots,s)\end{array} (M(t,i) + \gamma(y_t, x^{it}, j)) \quad \text{Equation 1}$$

Then the state $x^{j,t+1}$ 205 consists of the basic state j 205 with the history indicator 215 determined by the history of the best previous basic state $i_{min}^t$ 205, so the next state 205 is $x^{j,t+1}=j.i_{min}^t h^{i_{min}^t}$.

It is conventional in the Viterbi algorithm to propagate not only the path metrics, but also a representation of the sequence of states 205 in the paths. While the fractional part of the state 205 accomplishes this in principle, due to numerical precision and speed considerations, superior results may be obtained using the history indicator 215 rather than using the fractional state 205. In addition to storing information for backtrace, the history indicator 215 for each retained path in the Viterbi algorithm provides information for the estimation algorithms described below.

State Transition Probability Estimation

When the Viterbi algorithm is used for state sequence estimation in a conventional HMM, the state transition probabilities may be estimated as shown in Equation 2.

$$\hat{a}_{j|i} = \frac{\text{number of transitions from state } i \text{ to state } j}{\text{number of transitions from state } i \text{ to any state}} \quad \text{Equation 2}$$

Generalizing this to the quasicontinuous case is shown in Equation 3.

$$\hat{a}_{j|i}(h) = \frac{\text{number of transitions from state } i \text{ to state } j}{\text{number of transitions from state } i \text{ to any state}} \quad \text{Equation 3}$$

However, since history indictors h 215 exist on a continuum, there will not be sufficient counts for reliable probability estimates. To deal with this, the interval [0,1) is quantized into N regions, with centroids $h^1, \ldots, h^N$, and Voronoi regions $\tilde{h}^i=\{h\in[0,1): d(h, h^i)\leq d(h, h^j) \text{ for } i\neq j\}$ for some distance function d.

In one example of calculating state transition probabilities between a plurality of statistical Markov model-like states, $i.h^i$ denotes the set of states 205 with histories in the set $\tilde{h}^i$. For $h\in\tilde{h}^i$, the histogram-based estimate is shown in Equation 4.

$$\overline{a}_{j|i}(h) = \frac{\text{number of transitions from } i.\tilde{h}^i \text{ to state } j.i\tilde{h}^i}{\text{number of transitions from } i.\tilde{h}^i \text{ to state } i.j\tilde{h}^i} \quad \text{Equation 2}$$

The complete set of state transition probabilities consists of $S^2$ such functions, of which S=3 are shown in the figure. A parametric approximation of the transition density may be obtained as follows. Let $\phi_i(h):[0,1)\to R$ be a basis function, such that $\{\phi_i(h), i=1, \ldots, M\}$ is a linearly independent set. The state transition probability is now represented parametrically as shown in Equation 5.

$$\hat{a}_{j|i}(h) = \Sigma_{l=1}^M a_{j|i}^l \phi_l(h) \quad \text{Equation 5}$$

The coefficients may be chosen to minimize the error norm to a histogram-based estimated, subject to a sum-to-one constraint. Selecting the use of the 2-norm leads to minimizing Equation 6 subject to Equations 7 and 8.

$$\Sigma_{i=0}^s \Sigma_{j=0}^s \int_0^1 (\hat{a}_{j|i}(h)-\overline{a}_{j|i}^l \phi_l(h))^2 dh \quad \text{Equation 6}$$

$$\Sigma_{j=0}^s \hat{a}_{j|i}(h)=1 \quad \text{Equation 7}$$

$$\hat{a}_{j|i}(h)\geq 0 \quad \forall h\in[0,1) \quad \text{Equation 8}$$

This can be conveniently expressed in matrix/vector notation as shown in Equations 9-13.

$$A_i = \begin{bmatrix} a_{0|i}^1 & a_{0|i}^2 & \dots & a_{0|i}^M \\ a_{1|i}^1 & a_{1|i}^2 & \dots & a_{1|i}^M \\ \vdots & & & \\ a_{s|i}^1 & a_{s|i}^2 & \dots & a_{s|i}^M \end{bmatrix} \quad \text{Equation 9}$$

$$\varphi(h) = \begin{bmatrix} \varphi_1(h) \\ \varphi_2(h) \\ \vdots \\ \varphi_3(h) \end{bmatrix} \quad \text{Equation 10}$$

$$\bar{a}_{|i}(h) = \begin{bmatrix} \bar{a}_{0|i}(h) \\ \bar{a}_{1|i}(h) \\ \vdots \\ \bar{a}_{s|i}(h) \end{bmatrix} \quad \text{Equation 12}$$

$$\hat{a}_{|i}(h) = \begin{bmatrix} \hat{a}_{0|i}(h) \\ \hat{a}_{1|i}(h) \\ \vdots \\ \hat{a}_{s|i}(h) \end{bmatrix} \quad \text{Equation 13}$$

Equation 5 can thus be expressed as Equation 14.

$$\hat{a}(h) = A_i \varphi(h) \quad \text{Equation 14}$$

$A_{|i}$ may be chosen so that $A_i\varphi(h) \approx \bar{a}(h)$ and $1^T A_i \varphi(h)=1$ and $A_i\varphi(h) \geq 0$, $\forall h \in [0,1)$, wherein 1 is a vector of all ones. Satisfaction of the sum-to-one constraint is accomplished by eliminating the last row of $A_i$. Using a MATLAB-like notation, let $\tilde{A}_i$ denote the first S−1 rows of $A_i$: $\tilde{A}_i = A_i(0:s-1,:)$. Then the constraint of Equations 7 and 8 becomes $A_i(s,:)\varphi(h) = 1 - 1^T\tilde{A}_i\varphi(h)$. The expression $\hat{a}(x) = A_i\varphi(h)$ can be written as shown in Equation 15 and 16, where $$D = \begin{bmatrix} I \\ -1^T \end{bmatrix}$$

and $e_s = [0, 0, \ldots 1]^T$.

$$\hat{a}(h) = \begin{bmatrix} \tilde{A}_i \\ -1^T \tilde{A}_i \end{bmatrix} \varphi(h) + e_s \quad \text{Equation 15}$$

$$\hat{a}(h) = D\tilde{A}_i \varphi(h) + e_s \quad \text{Equation 16}$$

Defining $b_i(h) = \bar{a}_{|i}(h) - e_s$, the constrained optimization expressed in Equations 6, 7, and 8 may be expressed with Equation 17.

$$\text{Minimize } \int_0^1 \|D\tilde{A}_i\varphi(h) - b_i\|_2^2 dh \quad \text{Equation 17}$$

Equation 17 may be expressed with Equation 18, where the grammian $G = \int_0^1 \varphi(h)\varphi^T(h)dh$ and the crosscorrelation $P_{a,i} = \int_1^1 \varphi(h)b_i(h)^T dh$.

$$\text{Minimize } tr(\tilde{A}_i^T D^T \tilde{A}_i G) - 2tr(D\tilde{A}_i P_{a,i}) \quad \text{Equation 18}$$

Equation 18 may be minimized subject to the constraints of Equations 19 and 20.

$$1^T \tilde{A}_i \varphi(h) \leq 0 \quad \text{Equation 19}$$

$$\tilde{A}_i \varphi(h) \geq 0 \quad \text{Equation 20}$$

The constrained optimization problem represented by Equations 17, 19, and 20 may be solved using convex optimization.

Output Probability Estimation

Conditional output distributions µ may be Gaussian, and for states h 205 in the set $\tilde{h}^i$ may be expressed with Equation 21.

$$\bar{\mu}_i(h^i) = \frac{1}{N_i} \sum_{t: \hat{x}t=i,h} y_t \quad \text{Equation 21}$$

The state transition probabilities $\tilde{\mu}_i(h)$ may be calculated using Equation 22, where $M_i$ is a d×M coefficient matrix determined by a best fit to histogram estimates $\bar{\mu}_i(h)$.

$$\hat{\mu}_i(h) = M_i \phi(h) \quad \text{Equation 22}$$

Minimizing equation 17 generates Equation 23 with the crosscorrelation matrix of Equation 24.

$$M_i G = P_{m,i} \quad \text{Equation 23}$$

$$P_{m,i} = \int_0^1 \phi(h) \bar{\mu}_i(h)^T dh \quad \text{Equation 24}$$

Figure 4:
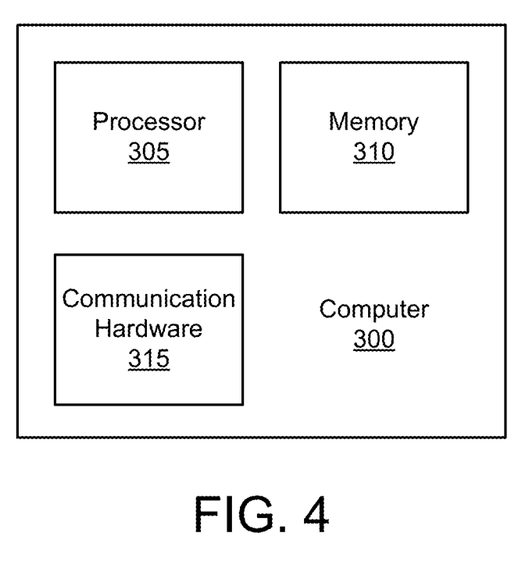
FIG. 4 is a schematic block diagram of a computer.

FIG. 4 is a schematic block diagram of a computer 300. The memory 310 may be a computer readable storage medium such as a semiconductor storage device, a hard disk drive, a holographic storage device, a micromechanical storage device, or the like. The memory 310 may store code. The processor 305 may execute the code. The communication hardware 315 may communicate with other devices.

Figure 5A:
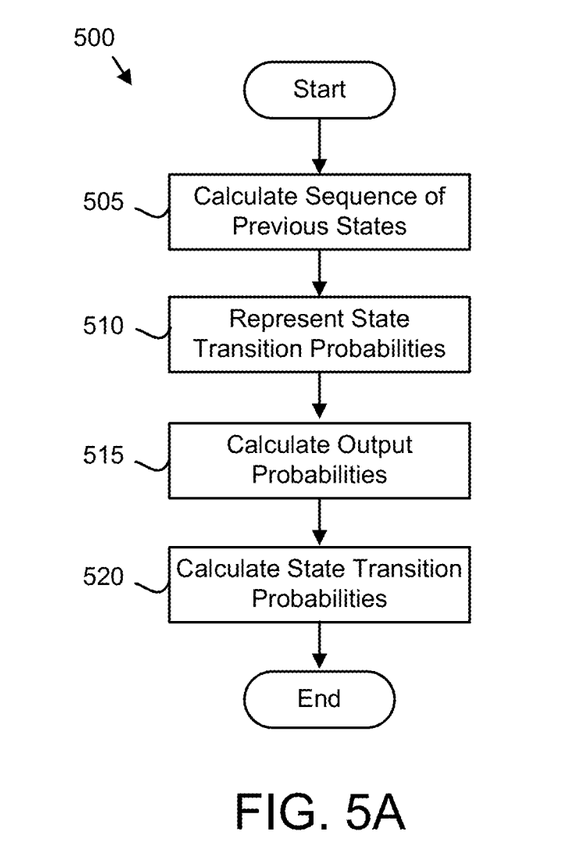
FIG. 5A is a schematic flow chart diagram illustrating one embodiment of a state transition probability calculation method.

FIG. 5A is a schematic flow chart diagram illustrating one embodiment of a state transition probability calculation method 500. The method 500 may be performed by the processor 305. Alternatively, the method 500 may be performed by a program product comprising a computer readable storage medium.

The method 500 starts, and in one embodiment the computer 300 calculates 505 a plurality of previous statistical Markov model-like states 205. The previous statistical Markov model-like states 205 may be calculated 505 as shown in FIGS. 2C-D, by appending a previous state 205 to a history indicator 215 using the i.h→j.ih. rule.

The computer may represent 510 state transition probabilities $\bar{a}_{j|i}(h)$ as between a plurality of statistical Markov model-like states 205 and output probabilities $\bar{\mu}_i(h^i)$ associated with the plurality of previous statistical Markov model-like states 205. The state transition probabilities between the plurality of previous states 205 depend on a sequence of previous states 205 of the plurality of previous states 205. The sequence of previous states 205 may calculated using a branch metric with a current state 205, a history leading to the current state 205, and a next state 205. The output probabilities associated with each of the plurality of states 205 depend on the sequence of previous states 205.

The computer 300 may calculate 515 an output probability $\bar{\mu}_i(h^i)$ for the plurality of states 205. The output probability $\bar{\mu}_i(h^i)$ may be calculated 515 as a parametric approximation of an output histogram of the history transitions 225. In one embodiment, the output probability may be calculated 510 using equation 21.

The computer 300 may calculate 520 a state transition probability $\bar{a}_{j|i}(h)$ for the plurality of states 205 and the method 500 ends. In one embodiment, the state transition probability $\bar{a}_{j|i}(h)$ is calculated 520 as a parametric approximation of a transition histogram of the history transitions of the history indicator 215. In a certain embodiment, the computer 300 calculates 515 the state transition probability $\bar{a}_{j|i}(h)$ as described for FIG. 5B.

Figure 5B:
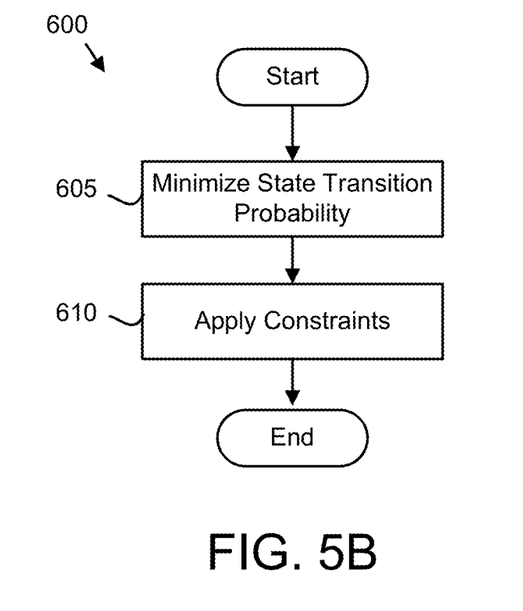
FIG. 5B is a schematic flow chart diagram illustrating one alternate embodiment of a state transition probability calculation method.

FIG. 5B is a schematic flow chart diagram illustrating one alternate embodiment of a state transition probability calculation method 600. The method 600 be the calculate state transition probabilities step 520 of FIG. 5A. The method 600 may be performed by the processor 305. Alternatively, the method 600 may be performed by a computer program product comprising a computer readable storage medium.

The method 600 starts, and in one embodiment, the computer 300 minimizes 605 the state transition probability $\bar{a}_{j|i}(h)$. In one embodiment, the computer 300 minimizes 605 the expression of Equation 18. In addition, the computer 300 may apply 610 the constraints of Equations 19 and 20 and the method 600 ends.

Figure 6A:
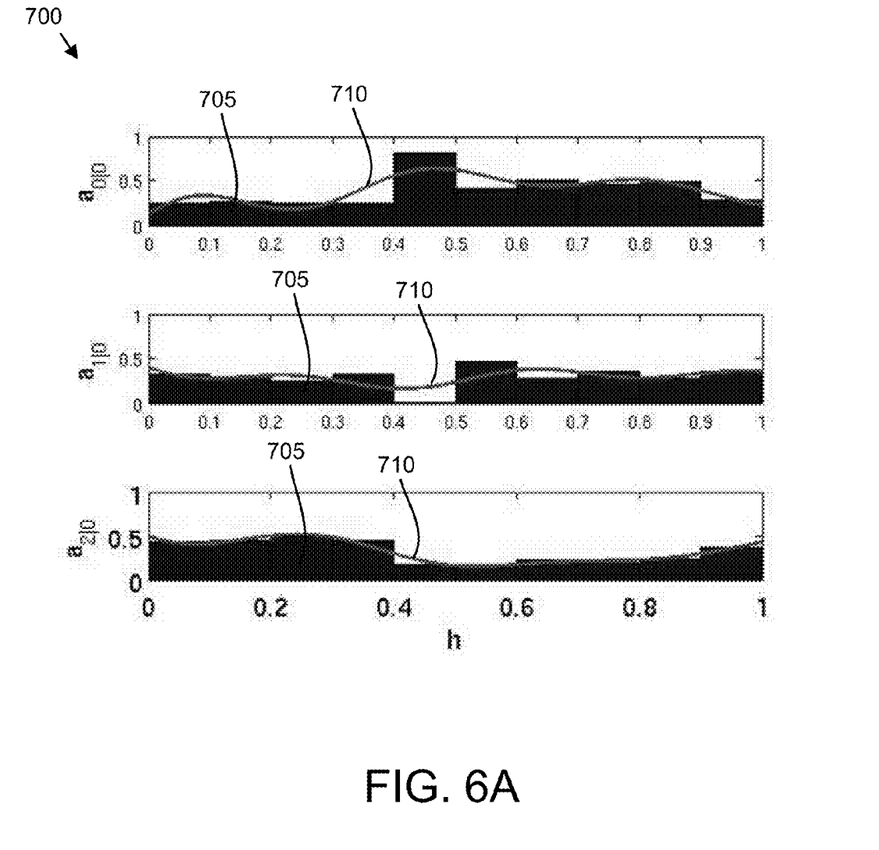
FIG. 6A includes graphs illustrating one embodiment of an estimated probability transition function.

FIG. 6A shows graphs 700 illustrating one embodiment of an estimated probability transition function. For a given (j,i), the estimated state transition probability $\bar{a}_{j|i}(h)$ is shown as a normalized histogram 705. The normalized histogram 705 may be represented with an efficient parametric representation $\hat{a}_{j|i}(h)$ as indicated by the state transition line 710.

Figure 6B:
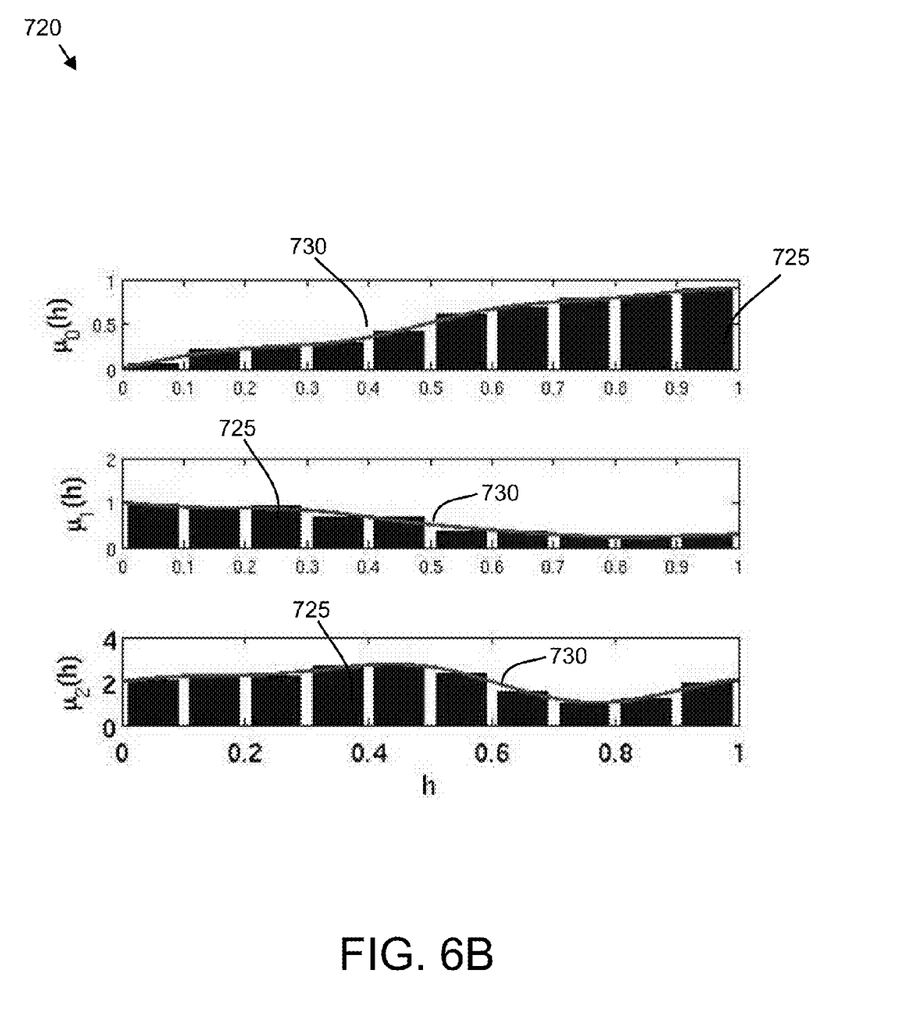
FIG. 6B includes graphs illustrating one embodiment of estimated state transition probability.

FIG. 6B includes graphs 720 illustrating one embodiment of a histogram function $\bar{\mu}_i(h)$ 725 and parametric approximation 730 for a quantized history indicator h 210 for i=0 to 2.

Figure 6C:
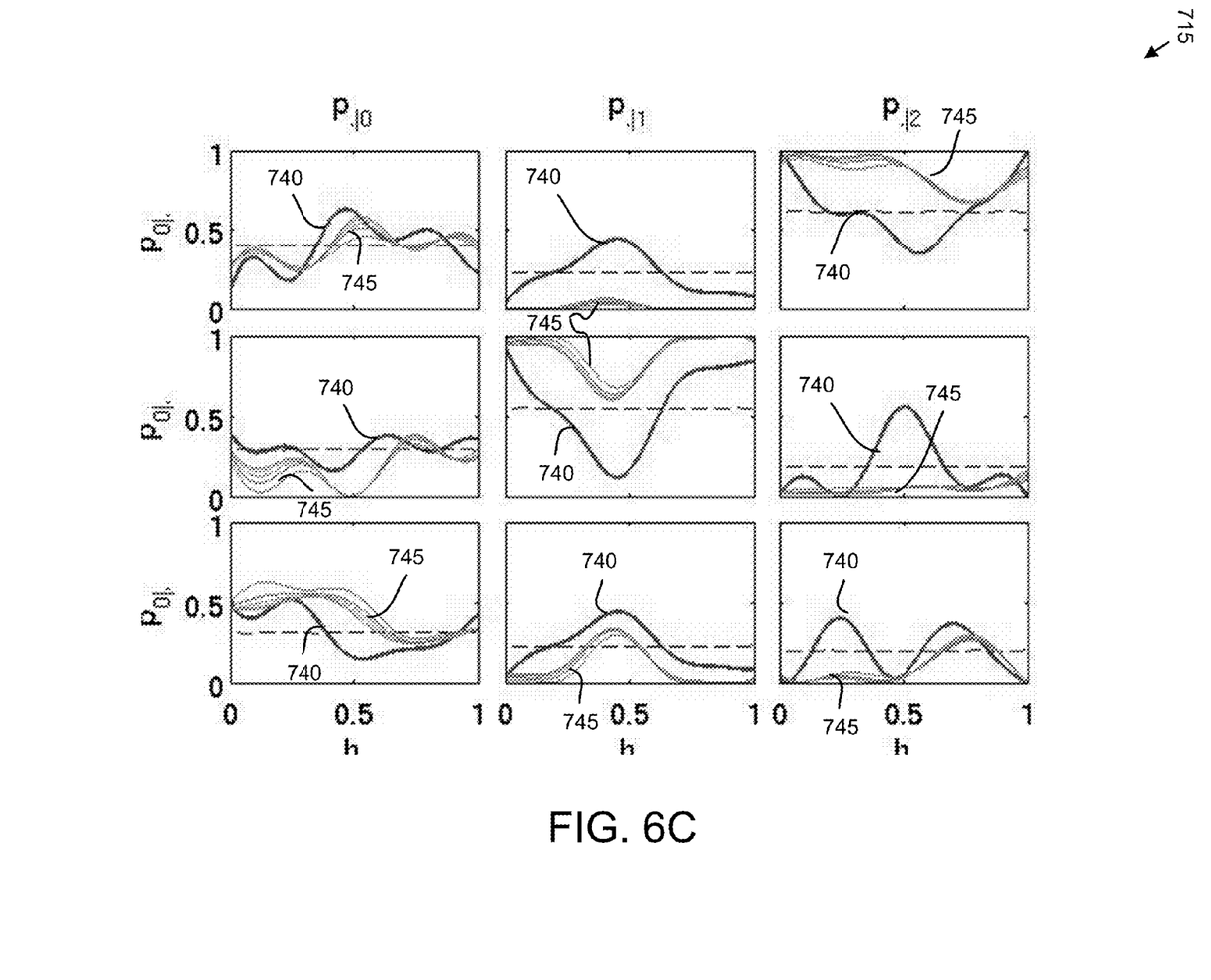
FIG. 6C includes graphs illustrating one embodiment of history dependent state transition probabilities.
Figure 6D:
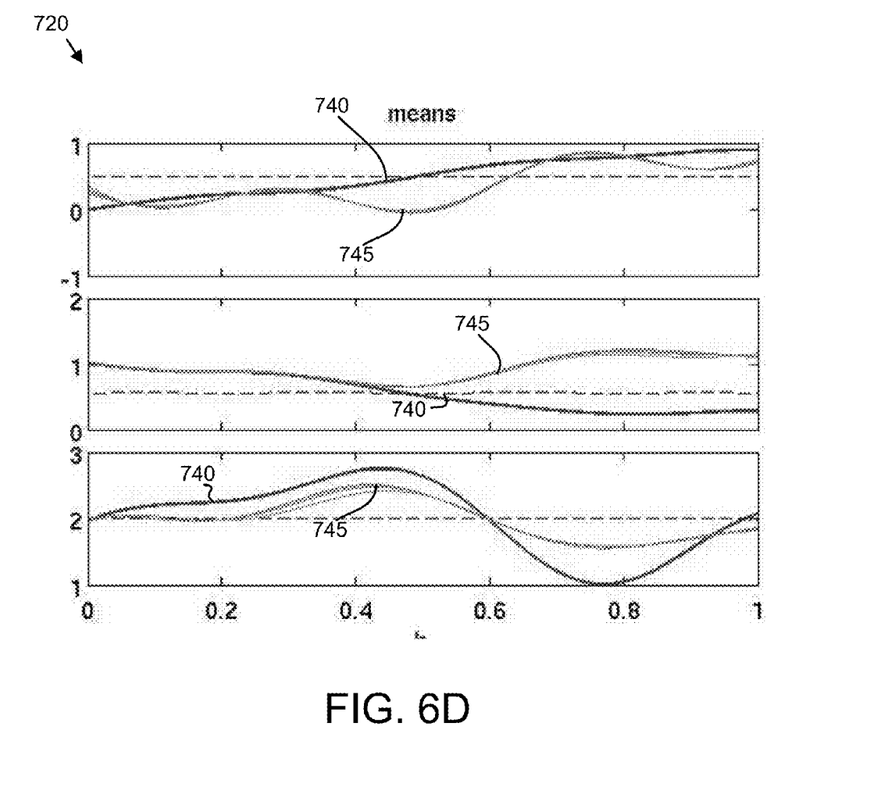
FIG. 6D includes graphs illustrating one embodiment of history dependent means of output distributions.

FIGS. 6C and 6D includes graphs illustrating one embodiment of history-dependent transition probabilities and output distribution means used to generate data for a S=3-state qcHMM. True data 740 (dark lines) and state transition probabilities 745 (light lines) are shown. The embodiments generated for observation sequences of length 10 using these probabilities. 10,000 such sequences were generated and used to form N=10-bin histograms for the S2 state transition histograms and S mean histograms. The histogram data was fitted to transition and mean probabilities as in Equations 5 and 22 using M=10 basis functions, which were Gaussian basis functions with 2=0.05. This estimation process was repeated five times using the same training data each time, starting from constant probabilities and means shown.

Figure 6E:
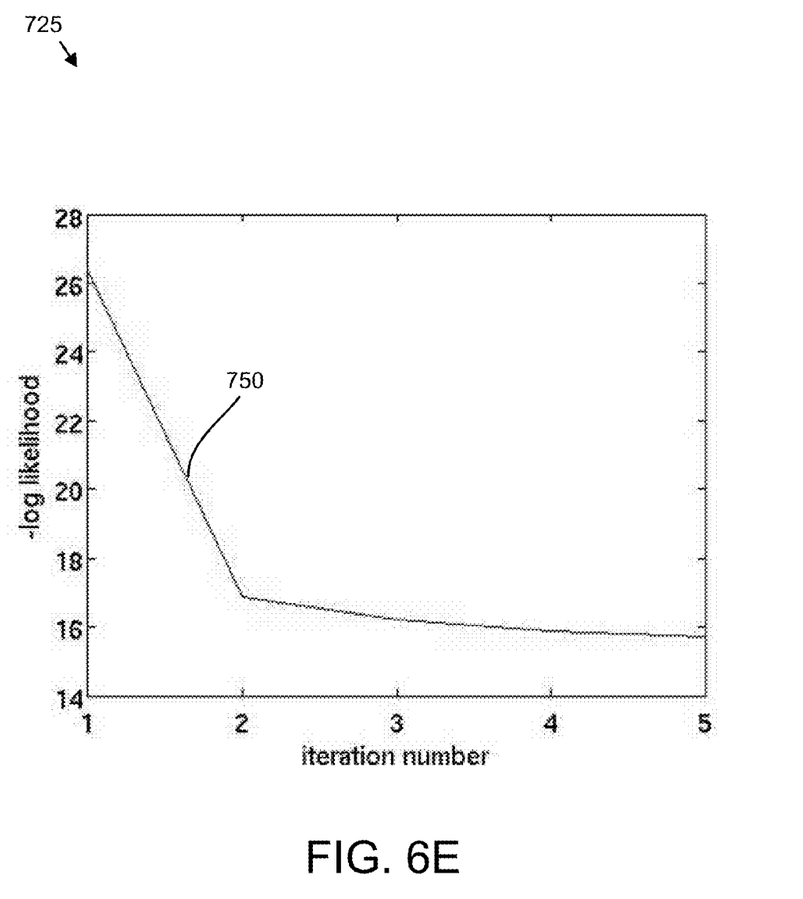
FIG. 6E is a graph illustrating one embodiment of training scores.

FIG. 6E is a graph illustrating one embodiment of training scores 750 over the multiple iterations. The training score 750 is a negative log likelihood of the output signal 125 representing the input signal 115.

By using the history embodied in the history indicator 215, a signal history may be incorporated in a signal analysis without an excessive computational burden. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
representing, by use of a processor, state transition probabilities between a plurality of states that are statistical Markov model states and output probabilities associated with a plurality of previous states that are previous statistical Markov model states, wherein each of the plurality of states is represented by an integer state indicator i that indicates a current basic state, and a history indicator comprising a real number in the form $h_1 h_2 \ldots h_n$ created as a concatenation of previous state indicators h, with more recent previous state indicators h having more numerical significance, to provide a signal history without excessive computational burden, the state transition probabilities between the plurality of previous states depend on a sequence of previous states of the plurality of previous states and the output probabilities associated with each of the plurality of states depend on the sequence of previous states;

calculating a state transition probability for the plurality of states by minimizing an expression $tr(\tilde{A}_i^T D^T \tilde{A}_i G) - 2tr(D\tilde{A}_i P_{a,i})$ subject to constraints that $1^T \tilde{A}_i \phi(h) \leq 0$ and $\tilde{A}_i \phi(h) \geq 0$, wherein $A_{1i}$ is chosen so that $A_i \phi(h) \approx \bar{a}(h)$, $1^T A_i \phi(h) = 1$, $A_i \phi(h) \geq 0$, $\forall h \in [0,1)$, 1 is a vector of all ones, $$D = \begin{bmatrix} I \\ -1^T \end{bmatrix}, G = \int_0^1 \varphi(h)\varphi^T(h)dh \text{ and } P_{a,i} = \int_1^1 \varphi(h)b_i(h)^T dh,$$

where G is a Grammian, $P_{a,i}$ is a cross correlation, $\phi(h)$ is a basis function, $A_i$ is a state transition probability matrix, $\tilde{A}_i$ denotes a first s−1 rows of $A_i$, $\bar{a}(h)$ is a histogram-based estimate state transition probability, and $b_i(h)^T = \bar{a}_{1,i}(h) - e_s$, $e_s = [0, 0, \ldots 1]^T$; and using the calculated state transition probability to generate an output signal for use in signal analysis that includes pattern recognition or pattern detection.

2. The method of claim 1, wherein the state transition probability is further calculated using a transition histogram comprising information from the sequence of previous states.

3. The method of claim 2, wherein the state transition probability is further calculated as a parametric approximation of each state transition probability.

4. The method of claim 1, wherein the output probability is calculated using a probability histogram comprising information from the sequence of previous states.

5. The method of claim 4, wherein the output probability is calculated as a parametric approximation of the output probabilities for each state.

6. The method of claim 1, wherein the sequence of previous states is calculated using a branch metric with a current state, a history leading to the current state, and a next state, the branch metric measuring the output probabilities from a transition from the current state to the next state.

7. A program product comprising a non-transitory computer readable storage medium that stores code executable by a processor, the executable code comprising code to perform:

representing state transition probabilities between a plurality of states that are statistical Markov model states and output probabilities associated with a plurality of previous states that are previous statistical Markov model states, wherein each of the plurality of states is represented by an integer state indicator i that indicates a current basic state, and a history indicator comprising a real number in the form $h_1 h_2 \ldots h_n$ created as a concatenation of previous state indicators h, with more recent previous state indicators h having more numerical significance, to provide a signal history without excessive computational burden, the state transition probabilities between the plurality of previous states depend on a sequence of previous states of the plurality of previous states and the output probabilities associated with each of the plurality of states depend on the sequence of previous states;

calculating a state transition probability for the plurality of states by minimizing an expression $\operatorname{tr}(\tilde{A}_i^T D^T \tilde{A}_i G) - 2\operatorname{tr}(D\tilde{A}_i P_{\alpha,i})$ subject to constraints that $1^T \tilde{A}_i \phi(h) \leq 0$ and $\tilde{A}_i \phi(h) \geq 0$, wherein $A_{|i}$ is chosen so that $A_i \phi(h) \approx \bar{a}(h)$, $1^T A_i \phi(h) = 1$, $A_i \phi(h) \geq 0$, $\forall h \in [0,1)$, 1 is a vector of all ones, $$D = \begin{bmatrix} I \\ -1^T \end{bmatrix},$$

$G = \int_0^1 \phi(h) \phi^T(h) dh$ and $P_{a,i} = \int_1^1 \phi(h) b_i(h)^T dh \int_1^1 \phi(h) b_i(h)^T dh$, where G is a Grammian, $P_{a,i}$ is a cross correlation, $\phi(h)$ is a basis function, $A_i$ is a state transition probability matrix, $\tilde{A}_i$ denotes a first s−1 rows of $A_i$, $\bar{a}(h)$ is a histogram-based estimate state transition probability, and $b_i(h)^T = \bar{a}_{1,i}(h) - e_s$, $e_s = [0, 0, \ldots 1]^T$; and using the calculated state transition probability to generate an output signal for use in signal analysis that includes pattern recognition or pattern detection.

8. The program product of claim 7, wherein the state transition probability is further calculated using a transition histogram comprising information from the sequence of previous states.

9. The program product of claim 8, wherein the state transition probability is further calculated as a parametric approximation of each state transition probability.

10. The program product of claim 7, wherein the output probability is calculated using a probability histogram comprising information from the sequence of previous states.

11. The program product of claim 10, wherein the output probability is calculated as a parametric approximation of the output probabilities for each state.

12. The program product of claim 7, wherein the sequence of previous states is calculated using a branch metric with a current state, a history leading to the current state, and a next state, the branch metric measuring the output probabilities from a transition from the current state to the next state.

13. An apparatus comprising:

a processor;

a memory that stores code executable by the processor, the code comprising:

code that represents state transition probabilities between a plurality of states that are statistical Markov model states and output probabilities associated with a plurality of previous states that are previous statistical Markov model states, wherein each of the plurality of states is represented by an integer state indicator i that indicates a current basic state, and a history indicator comprising a real number in the form $h_1 \; h_2 \ldots h_n$ created as a concatenation of previous state indicators h, with more recent previous state indicators h having more numerical significance, to provide a signal history without excessive computational burden, the state transition probabilities between the plurality of previous states depend on a sequence of previous states of the plurality of previous states and the output probabilities associated with each of the plurality of states depend on the sequence of previous states; and code that calculates a state transition probability for the plurality of states by minimizing an expression $\operatorname{tr}(\tilde{A}_i^T D^T \tilde{A}_i G) - 2\operatorname{tr}(D\tilde{A}_i P_{\alpha,i})$ subject to constraints that $1^T \tilde{A}_i \phi(h) \leq 0$ and $\tilde{A}_i \phi(h) \geq 0$, wherein $A_{|i}$ is chosen so that $A_i \phi(h) \approx \bar{a}(h)$, $1^T A_i \phi(h) = 1$, $A_i \phi(h) \geq 0$, $\forall h \in [0,1)$, 1 is a vector of all ones, $$D = \begin{bmatrix} I \\ -1^T \end{bmatrix},$$

$G = \int_0^1 \phi(h) \phi^T(h) dh$, and $P_{a,i} = \int_i \phi(h) b_i(h)^T dh$, where G is a Grammian $P_{a,i}$ is a cross correlation, $\phi(h)$ is a basis function, $A_i$ is a state transition probability matrix, $\tilde{A}_i$ denotes a first s−1 rows of $A_i$, $\bar{a}(h)$ is a histogram-based estimate state transition probability, and $b_i(h)^T = \bar{a}_{1,i}(h) - e_s$, $e_s = [0, 0, \ldots 1]^T$; and using the calculated state transition probability to generate an output signal for use in signal analysis that includes pattern recognition or pattern detection.

14. The apparatus of claim 13, wherein the state transition probability is further calculated using a transition histogram comprising information from the sequence of previous states.

15. The apparatus of claim 14, wherein the state transition probability is further calculated as a parametric approximation of each state transition probability.

* * * * *